July 7, 1953  M. HETZEL ET AL  2,644,938
SCHLIEREN CATHODE-RAY LIGHT MODULATOR WITH
MODULATING LIQUID ON CONCAVE MIRROR
Filed March 5, 1949  3 Sheets-Sheet 1

INVENTORS:
MAX HETZEL
FRED AUGUST MAST
HUGO ERNST WILHELM THIEMANN
BY K.A. May
ATTORNEY

July 7, 1953
M. HETZEL ET AL
2,644,938
SCHLIEREN CATHODE-RAY LIGHT MODULATOR WITH
MODULATING LIQUID ON CONCAVE MIRROR
Filed March 5, 1949
3 Sheets-Sheet 2
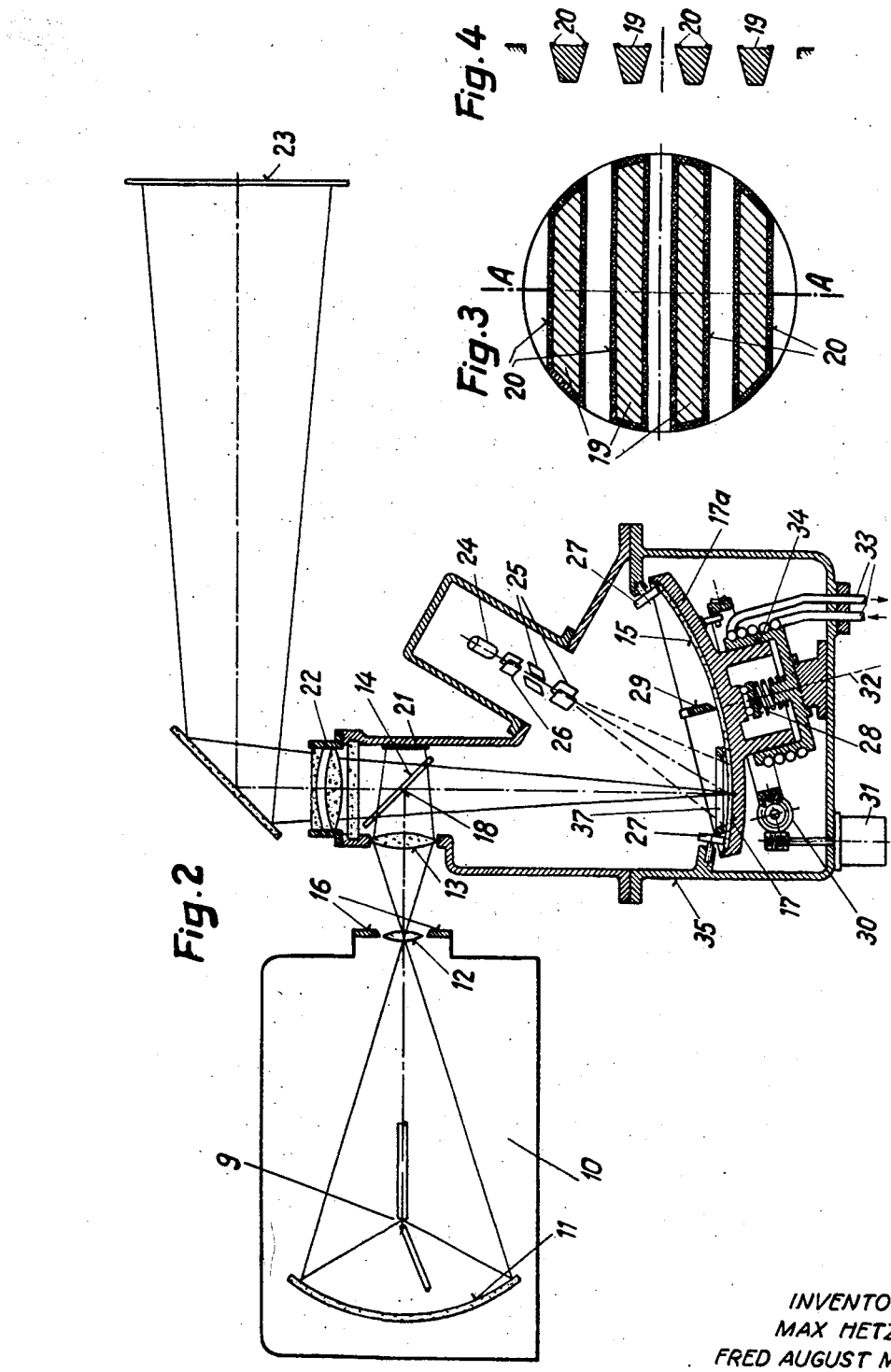
INVENTORS:
MAX HETZEL
FRED AUGUST MAST
HUGO ERNST WILHELM THIEMANN
BY K. A. Mayr
ATTORNEY.

July 7, 1953 M. HETZEL ET AL 2,644,938
SCHLIEREN CATHODE-RAY LIGHT MODULATOR WITH
MODULATING LIQUID ON CONCAVE MIRROR
Filed March 5, 1949 3 Sheets-Sheet 3
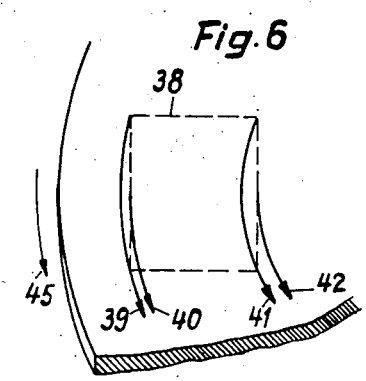
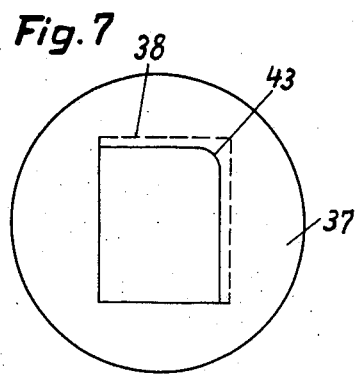
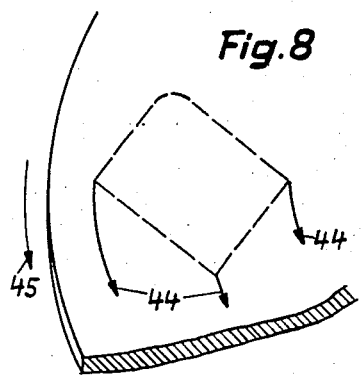
INVENTORS:
MAX HETZEL
FRED AUGUST MAST
HUGO ERNST WILHELM THIEMANN
BY K. A. May
ATTORNEY.

Patented July 7, 1953

2,644,938

UNITED STATES PATENT OFFICE 2,644,938

SCHLIEREN CATHODE-RAY LIGHT MODULATOR WITH MODULATING LIQUID ON CONCAVE MIRROR

Max Hetzel, Fred August Mast, and Hugo Ernst Wilhelm Thiemann, Zurich, Switzerland, assignors to Gesellschaft zur Forderung der Forschung an der Eidg, Technischen Hochschule, Zurich, Zurich, Switzerland, a firm of Switzerland Application March 5, 1949, Serial No. 79,864
In Switzerland November 30, 1948

12 Claims. (Cl. 340—370)

For reproducing television pictures with great light intensity one method, whereby the light current of an extraneous source of light, for instance, an arc lamp, is controlled, has proved itself particularly serviceable. This method is described in the Patent No. 2,391,450. Therein, for the control, a film of a viscous liquid, or an elastic body with great internal friction is employed, the surface of which is deformed by electrostatic forces proportionate to the television picture content. The deformations, which enable an excellent storage of the incoming video signals, are utilized in a Schlieren-optical system for controlling the light. A cathode-ray covers a rectangular area on the surface of the control layer point by point and line by line according to the size of the television picture. The cathode-ray itself is modulated in accordance with the picture content, i. e. according to the electric video signals, whereby the above-mentioned locally varying electrostatic forces are set up which eventually lead to the desired deformations.

Experiments have shown that in practice difficulties arise on the known method of obtaining high-quality pictures, i. e. television pictures of great clarity and high contrast.

In the known arrangements as per Patent No. 2,391,450 and according to the corresponding additional Patent No. 2,391,451, one or more slits are imaged by a projection mechanism on to one or more bars in such a way that with a flat and undeformed surface of the control layer no light can reach the projection screen. The underlying conception of the control up to the present has been to deflect the light beams by deforming the surface according to the refraction of the light thereon. Thus the light can pass the bar or bars and reach the screen. The quantity of light passing the bars is thus proportional to the angle at which the surface of the control layer is inclined.

If the slit system comprises a series of equidistant slits, whereby the slit-width is equal to that of the bars separating the slits, the bar system on which the complete slit system is imaged must include as many bars as there are slits. If the angle of inclination of the control layer attains such a value that, due to deflection, the image of the slit comes to lie just between the bars of the bar-system, all the light consequently passes between the bars and reaches the screen. Assuming the picture contrast number, i. e. the ratio of the light of the brightest spot to the light of the darkest spot, to be, say 100, then the imaging efficiency of the slit system on the bar-system must obviously be increased to such an extent that the deflections are only $\frac{1}{100}$ of the width of the bar. Consequently an extremely accurate image of the slit is required for contrasty pictures. Now the use of an optical image is objectionable for various reasons. The system producing the image, say an objective, always involves various defects. These consist in the well-known aberration faults, the sum of which is characterized by the so-called circle of confusion. Hence for the above example the system must satisfy the requirement that the circle of confusion must be smaller than $\frac{1}{100}$ of the bar-width. This requirement is, however, very difficult to fulfil with the comparatively large relative apertures of the objectives generally used in practice.

A further shortcoming of the image is due to the defects in the control layer. Namely, if the control layer possesses local inhomogeneities of the refractive index or uneven thickness of the layer, a deflection of the light beam in the above sense will also take place. This deflection may again at the utmost not exceed $\frac{1}{100}$ of the bar-width. In practice the fulfilment of this requirement meets serious difficulties. This may readily be understood from the fact that the said requirement must still be complied with even when the cathode-ray passes over the control layer at constant intensity and constant velocity. If the control layer presents only small local variations in its electrical conductivity, the electrostatic forces set up in the control layer in the electric field cause detrimental deformations.

Even when the deflections of the light beams are smaller than the diameter of the circle of confusion, portions thereof may still go past the bars. Due to chromatic aberrations of the objective there arises locally a variously coloured dark field of a very disturbing character.

Further, in the known arrangements the control layer lies on a glass plate through which the light falls. Applied between the control layer and the glass plate is a transparent metallic coating as an electrode which, in the main, serves to conduct away the electron stream falling on the surface of the control layer and reaching the electrode by means of the electric conductivity of the control layer. In practice the control layer possesses operating temperatures which are generally considerably lower than room temperature. The control layer and hence the carrier plate must therefore be cooled, whereby condensation may occur on the underside of the glass plate. When the plate is placed in vacuum, this condensate consists of condensed oil vapours. Small drops of condensate are formed, which have an effect similar to the deformed surface itself and thus light up the dark field in a disturbing manner. It is not easy to avoid such condensation, which could be circumvented only by additional and awkward features of design.

The production of a transparent electrically conducting metallic coating, on which the control layer rests, presents a difficult problem. On the one hand this metal coating should absorb the least possible amount of light so as to avoid the control medium being heated in a disturbing manner, while on the other hand its electrical conductivity should be as high as possible. Such a control layer is extremely sensitive to mechanical damage and is liable to be easily harmed even by such foreign bodies as dust particles. Thereby electric interruptions result in the electrode, thus giving rise to seriously disturbing illuminations.

Furthermore, in the known arrangements, lenses and glass plates must unavoidably be mounted in the actual Schlieren-part of the optical system, i. e. between the slit and the bars. The reflexions of light on the individual glass surfaces, which may be remedied to a certain extent, causes fairly much diffracted light, which already lights up the dark field in a disturbing way. In addition a very slight amount of soiling of the glass surfaces is already liable to cause so much diffracted light that high image contrast may be unobtainable.

A further difficulty in the known arrangements arises in that the control layer cannot continuously be cooled in an efficient way. It is therefore necessary to limit the period during which the control layer is used in the light beam, in order to keep within reasonable limits the rise in temperature of the control layer due to light absorption in the metallic coating and in the control layer. On account of the slow change of the control layer, i. e. due to its slow movement through the light beam, interference phenomena arise in the production of frames on the surface, which impair the clarity of the picture and the uniformity of the illumination of the picture field.

Moreover, the arrangements known so far require rather bulky apparatuses which are unwieldy to install and service.

The present invention is intended to obviate the aforementioned shortcomings and relates to a device for reproducing a television picture with a cathode-ray tube, an extraneous source of light, and a control layer spread out to form a surface, which is contained in a Schlieren-optical system and which by means of electrical charges applied by a cathode-ray tube undergoes superficial deformations corresponding to the television picture. In its essence the device as per invention is characterized in that the control layer is applied to a concave mirror.

Further features of the invention appear from the appended claims, the description and the drawings in which a preferred form of embodiment is illustrated.

Fig. 2 is a lay-out of the apparatus in principle;

Fig. 3 represents the mirror system;

Fig. 4 is a cross-section taken on the line A—A of Fig. 3;

Fig. 6 shows the effect of image limitation;

Fig. 7 shows the diaphragm for limiting the image;

Fig. 8 illustrates the action of the diaphragm.

Figure 1:
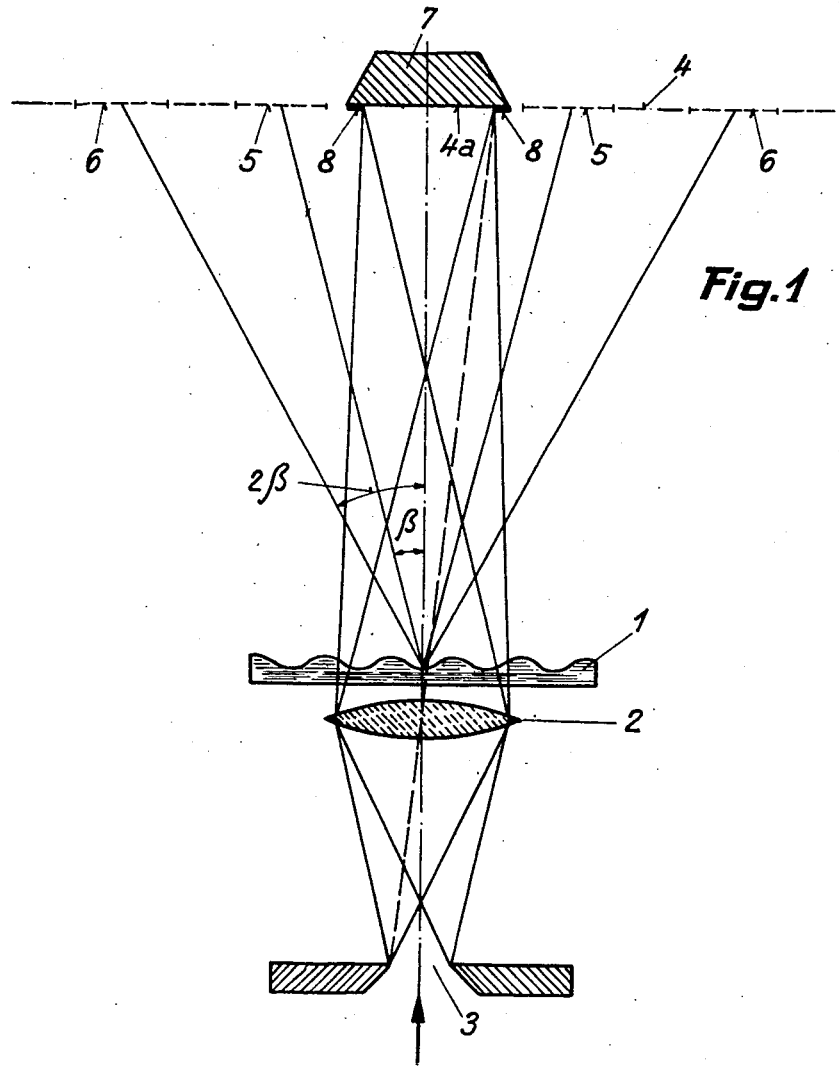
Fig. 1 illustrates the principle of the light control.

A superficially deformed control layer 1 lies directly in front of the imaging system 2 which may, for instance, comprise a combination of lenses. A slit 3 illuminated from below (arrow P) is imaged in a plane 4 by means of the said system 2. With undeformed control layer 1, at point 4a in plane 4, the so-called image of zero order is produced. At point 4a, a bar 7 or the like is disposed to prevent the light from passing upwards. Arranged over the bar 7 is an objective normally adapted to produce an image of the control layer 1 on the screen. As these elements are not essential for the light control proper, they have been omitted in the drawing.

According to the invention the bars 7 are on both sides made broader than the width corresponding to the dimensions of the zero order image. These enlargements 8 in the width should on both sides amount to at least 10 per cent of the width of the zero order image. If the frames of the television picture become very fine and hence the period i. e. wavelength of the periodic deformations of the control layer 1 be chosen correspondingly very small, then the aforementioned older conception, according to which the surface deformation causes a refraction and hence a corresponding displacement of the optical picture of zero order, must be discarded. In its action the control layer 1 may no longer be considered as a liquid wedge, but must be regarded as an optical grid (phase grid). Then, as shown in the drawing, besides the image of zero order 4a, so-called secondary pictures of higher orders are produced due to the fact that at the points 5, 6 &c. displaced higher order images arise. The position of the secondaries 5, 6 &c. is given by the angle $\beta$ defined by the quotient of the wavelength of the light divided by the period i. e. wavelength of the deformations. As may be seen the method of functioning is fundamentally different from that hitherto assumed, where an unequivocably related deflection of the zero order image arises proportionate to the angle of deformation of the surface.

If the deformation of the control layer 1 acts as a diffraction grating, the position of the secondary pictures remains unchanged; on varying the amplitude of the deformation, only the light intensity changes in the individual secondary pictures.

From the fact that the desired short-periodic deformations of the control surface corresponding to the television picture, act as a diffraction grating with suitable dimensioning of the period and that the disturbing long-periodic variations of the control layer may in their effect be considered as a liquid wedge, the herein described enlargement 8 of the bar 7 brings about a separation of the action of the two types of deformation. The enlargement 8 prevents the disturbing light caused by long-periodic deformations of the control layer or long-periodic variations of the refractive index or the defects corresponding to the circle of confusion of the image from reaching the projection screen.

Therefore, even in the worst case, the enlargements 8 merely effect an insignificant diminution of the total light. However, they by no means influence the light control proper. In this way one succeeds in utilizing the desired deformations for the light control only. The sensitivity of the arrangement in respect to long-periodic variations of the control layer, which can in practice hardly be removed, is avoided. In the case of the dark picture the control layer 1 need no longer be absolutely flat. The refractive index of the layer may also vary somewhat locally and the imaging system 2 may possess a considerable circle of confusion.

Consequently it is possible to construct the imaging system 2 (Fig. 1) as a concave mirror.

Fig. 2 shows in principle the lay-out of the essential parts of the apparatus incorporating such a concave mirror for the case where a viscous, electrically conducting liquid is used as a control medium. The crater 9 of an arc lamp 10 is imaged by a mirror 11 in a field lens 12. A lens 13 produces the image of the field lens 12 through a mirror system 14 on to the control layer 15. Consequently, an image of the crater 9 of the arc lamp in the layer 15 lies also in the field lens 12, in which a rectangular diaphragm 16 determines the contour of the image. In this plane 16, filters may be introduced, for instance color filters adapted for reproducing television pictures in color.

The mirror system 14 comprises a number of mirror strips as shown in Figs. 3 and 4. These mirrors operate in a manner exactly similar to that of the slits 3 and bars 7 of Fig. 1. The mirror strips are spatially so arranged that the direction of the lines of the television picture are perpendicular to them.

Now the control layer 15 is located on a concave mirror 17 whose centre of curvature 18 lies in the plane of the mirror system 14. The action of the mirror 17 is similar to that of the optical system of Fig. 1, whereby the mirror system of the plane 14 is imaged in itself.

In Fig. 3 the hatched areas indicate reflecting surfaces 19, which are provided with black borders 20, corresponding to the enlargements 8 of the bars 7, whose action has been disclosed above in connexion with Fig. 1. As shown clearly in Fig. 3, the black borders 20 extend along all sides of the strips 19 and therefore constitute "frames" for the strips. Figs. 3 and 4 show an example with four mirrors; but a different number of mirrors may also be used. The light falling through the mirror system 14, which is lost for the control, is absorbed by a jet-black surface at 21. Consequently about 50 per cent of the total light of the arc lamp falls on the concave mirror 17. This light penetrates the control layer 15, is reflected from the concave mirror, once more traverses the control layer and, in the case of a dark image, i. e. undeformed control layer, returns to the mirror 14 and finally back into the crater 9.

When diffraction takes place at the deformed control layer 15 in the case of the finely framed surface deformations with a white picture, then, due to the secondary images, light passes through the mirror system and upwards into a projection objective 22, which exactly images the control layer 15 on the screen 23.

A cathode-ray produced by an electron-optical system and which, by means of deflections members 25, covers the picture surface 15 in the direction of the picture and of the lines, is controlled by the deflection plates 26 according to the video signal which is modulated on a high-frequency carrier. The deflections of the pair of plates 26 ensues in the direction of the lines.

The electron stream of the cathode-ray is passed through the electrically conducting control layer 15 on to the mirror 17 which must thus be electrically conductive on the surface.

The fixation of the concave mirror is effected by three stationarily mounted rollers 27 evenly distributed around the circumference, against which the concave mirror is pressed by means of a spring 28. In this way it is ensured that the centre of curvature of the mirror always lies at the same point, and remains independent of lateral movements of the mirror 17. A doctor blade 29 continuously smoothens the liquid layer 15 to its correct thickness. By means of a motor 31 and a gearing 30 the mirror 17 is caused to revolve around an oblique axis 32 passing through its centre of curvature 18. The mirror 17 which is preferably made of metal, so as to possess adequate heat conductivity, serves to carry off the heat absorbed in the mirror and in the control layer. By means of a cooling system 33 the heat is ultimately carried off in a bowl 34 designed as a liquid bearing. This continuous cooling makes possible an extremely slow movement of the concave mirror in contrast with the corresponding motion in the known arrangements. In this way the aforementioned detrimental interference phenomena in the production of frames on the control layer can be avoided. The maximum velocity in the image range should be so small that the local displacement of the control layer in one image period is smaller than one tenth of the local period of the deformation.

All parts associated with the viscous liquid 15 and the cathode-ray system 24 together with the mirror system 14 are housed in a container 35, tight against high vacuum, which is evacuated by appropriate pumps. Thus in the Schlieren-optical part between the mirror 17 and mirror system 14 there is not a single glass surface which could impair the contrast of the image. A further great advantage of the new arrangement is that the arc lamp may be located at a point which is suitable for servicing, and that a less bulky construction becomes possible for the whole equipment. The image contrast obtained is the best possible and is decided exclusively by the quality of the mirror 17 and the blackening of the enlargements 20 in Figs. 3 and 4. The continuous cooling of the control layer allows of reducing the speed of rotation of the concave mirror to such an extent that all detrimental phenomena due to the rotation can be avoided completely. The periods of revolution are in practice of the order of one hour.

The light streams obtainable with this equipment are practically unlimited and are determined solely by the size of the arc lamp. The surface of the concave mirror may be made of a very hard metal, for instance rhodium, so that no damage by dust particles &c. need be feared. In this way the great difficulties met with in the present arrangements using transparent electrodes are also overcome. As mentioned before, the light passes the control layer twice altogether. By suitably providing the thickness of the control layer the great advantage of an almost double effect may thus be achieved as against the case of a single passage of the light through the layer. To obtain this, the thickness of the layer according to the invention is chosen so small that the points where the incident and reflected light beams traverse the deformed surface are separated by a distance which is very small with respect to the local period of the deformations. This is ensured in practical optical arrangements, when the thickness of the layer is chosen smaller than the local period of the deformations. The double optical utilization of the control layer enables operation with slighter cathode-ray streams and brings about thus a desirable diminution of the demands made on the control layer and hence an appreciable prolongation of its effective life.

When a solid, elastic body with great internal damping is utilized as a control medium, the concave mirror 17 will be replaced by a smaller one the axis of which coincides with the vertical axis through point 18. A movement of the control layer is not necessary. Otherwise the arrangement remains essentially the same as that shown in Fig. 2.

Figure 5:
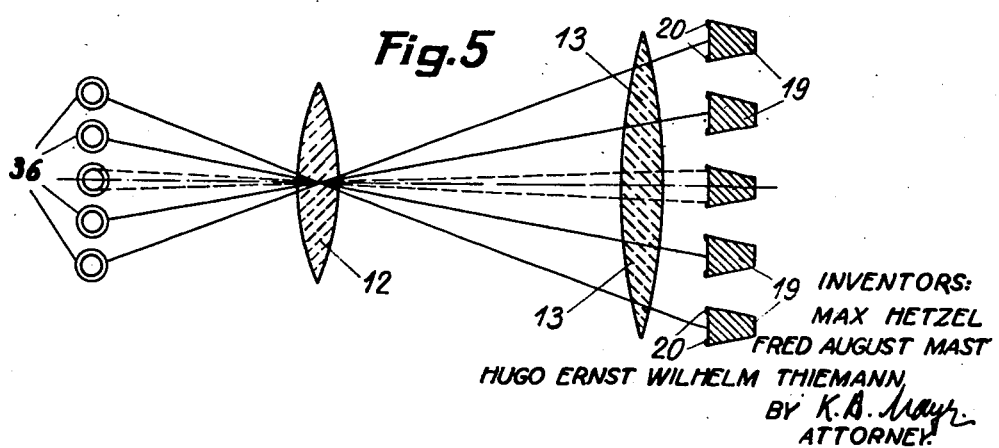
Fig. 5 illustrates a possible modification to Fig. 1.

If continuous operation is required, two arc lamps may be provided and alternatively used. It is also possible to work with continuously burning appliances, such as mercury high-pressure lamps; an example for this is shown in Fig. 5. Therein the field lens 12 can again be seen. The concave mirror 11 of the arc lamp (Fig. 2) is here replaced by a system of mercury high-pressure lamps 36 so arranged that their image, produced by the lens 12 comes to lie on the mirror 19 (Figs. 3 and 4).

The arrangements of a picture field blind 37 is shown in Figs. 6–8.

Fig. 6 exhibits the disturbances of the dark field caused by the borders of the picture. As is known, the cathode-ray in the case of a dark picture, covers the surface of the control layer 15 with constant velocity and constant intensity, its surface being thereby more or less evenly electrically charged. Thereby a superficial pressure arises over the whole picture area covered (with the rectangular frame 38), which is capable somewhat to diminish the thickness of the layer. Thus deformations of the surface must necessarily occur at the frame 38. As indicated in Fig. 6, disturbing circular deformations 39, 40, 41, 42 take place when the carrier of the control layer 15 is slowly moved. These disturbing deformations appear on the projection screen as pronounced local illuminations.

According to the invention a blind 37 (Figs. 2 and 7) is now arranged directly over the control layer 15, which possesses at least one rounded corner 43 and prevents the disturbing local over-illumination 41. The blind 37 has the great advantage that upon suitable arrangement any changes in the position of the covered surface with the frame 38 by no means cause detrimental results. Such changes in the position are due to voltage variations on the cathode-ray tube. Moreover, as indicated in Fig. 7, the blind 37 is so arranged that the surface with the frame 38 covered by the cathode-ray is disposed in conformity with the two dotted lines. There still remains the disturbing deformation 40 which is eliminated by aligning the blind 37 at an angle which is suitably oblique to the direction of movement 45 of the control layer 15 (Fig. 8). With this arrangement only the local over-illuminations 44 will appear which, as they fall outside the picture, are, however, not detrimental.

What we claim is:

1. Apparatus for producing a television picture on a separate screen by means of a cathode ray tube and a separate light source, comprising, in combination with the cathode ray tube and separate light source, a concave mirror exposed to the cathode and light rays, an electronically deformable transparent film applied to said mirror in the path of the cathode and light rays, the deformation of said film being periodic and corresponding to the degree of modulation of the cathode ray, which modulation depends on the amplitude of the video signal, and said deformation effecting correspondingly changing refractions of and controlling direction of the light reflected by said concave mirror, and a mirror system disposed substantially in the center of curvature of said concave mirror and comprising spaced strips having a light reflecting surface receiving light from said source and directing light beams through said film to said concave mirror and, if said film is not deformed, receiving the unmodulated light beams reflected by the concave mirror and directing same back to said source, said strips having opaque marginal portions, the surface of said strips being larger than the cross-sectional area of the unmodulated light beams thereat, said opaque portions absorbing uncontrollable light, the controllable light modulated by the deformed film passing through the spaces between said strips.

2. Apparatus as defined in claim 1, said opaque portions forming frames individually surrounding said light reflecting surfaces, said source of light being at least one high pressure mercury lamp, and said apparatus comprising optical lenses interposed between said lamp and said mirror system and affording imaging of said lamp onto said strips.

3. Apparatus according to claim 1, the total area of said opaque portions together with said light reflecting surfaces being at least twenty per cent larger than the cross-sectional area of the unmodulated light beams thereat.

4. Apparatus as defined in claim 1, the thickness of said film being less than the period of its periodic deformations.

5. Apparatus as defined in claim 1, comprising support means supporting said concave mirror revolvably about the center line of its curvature.

6. Apparatus according to claim 5, said support means comprising at least three roller means rolling on said mirror and resilient means pressing said mirror against said roller means.

7. Apparatus for producing a television picture on a separate screen by means of a cathode ray tube and a separate light source, comprising, in combination with the cathode ray tube and separate light source, a concave mirror exposed to the cathode and light rays, an electronically deformable transparent film applied to said mirror in the path of the cathode and light rays, the deformation of said film being periodic and corresponding to the degree of modulation of the cathode ray, which modulation depends on the amplitude of the video signal, and said deformation effecting correspondingly changing refractions of and controlling direction of the light reflected by said concave mirror, a mirror system disposed substantially in the center of curvature of said concave mirror and comprising spaced strips having a light reflecting surface receiving light from said source and directing light beams through said film to said concave mirror and, if said film is not deformed, receiving the unmodulated light beams reflected by the concave mirror and directing same back to said source, said strips having opaque marginal portions, the surface of said strips being larger than the cross-sectional area of the unmodulated light beams thereat, said opaque portions absorbing uncontrollable light, the controllable light modulated by the deformed film passing through the spaces between said strips, and backing means for said concave mirror made of heat conducting material.

8. Apparatus according to claim 7, comprising cooling means connected with said backing means.

9. Apparatus for producing a television picture on a separate screen by means of a cathode ray tube and a separate light source, comprising, in combination with the cathode ray tube and separate light source, a concave mirror exposed to the cathode and light rays, an electronically deformable transparent film applied to said mirror in the path of the cathode and light rays, the deformation of said film being periodic and corresponding to the degree of modulation of the cathode ray, which modulation depends on the amplitude of the video signal, and said deformation effecting correspondingly changing refractions of and controlling direction of the light reflected by said concave mirror, a mirror system disposed substantially in the center of curvature of said concave mirror and comprising spaced strips having a light reflecting surface receiving light from said source and directing light beams through said film to said concave mirror and, if said film is not deformed, receiving the unmodulated light beams reflected by the concave mirror and directing same back to said source, said strips having opaque marginal portions, the surface of said strips being larger than the cross-sectional area of the unmodulated light beams thereat, said opaque portions absorbing uncontrollable light, the controllable light modulated by the deformed film passing through the spaces between said strips, and a rectangular blind disposed adjacent to said concave mirror and defining the area scanned by the cathode ray and having at least one rounded corner.

10. Apparatus according to claim 9, at least two sides of said rectangular blind being in the way of the cathode ray scanning thereat and reducing the area scanned by said ray.

11. Apparatus according to claim 9, comprising means for rotating said concave mirror about its optical axis, and said cathode ray tube being so placed and operated that the lines along which the cathode ray scans the area defined by said blind are disposed at an angle to the tangents of the rotation velocity of the mirror.

12. Apparatus according to claim 9, comprising means for rotating said concave mirror about its optical axis at such speed that the extent of movement of the mirror within said blind during the time the picture area is scanned once by the cathode ray amounts to less than one-tenth of the period of periodic deformation of said film.

MAX HETZEL.
FRED AUGUST MAST.
HUGO ERNST WILHELM THIEMANN.

References Cited in the file of this patent

UNITED STATES PATENTS

| Number | Name | Date |
|---|---|---|
| 2,276,360 | Von Ardenne | Mar. 17, 1942 |
| 2,391,451 | Fischer | Dec. 25, 1945 |